United States Patent [19]

Perrine

[11] Patent Number: 4,839,183
[45] Date of Patent: Jun. 13, 1989

[54] METHOD OF PRODUCING A SLICED MEAT PRODUCT

[76] Inventor: Paul M. Perrine, 14 Paku Drive, Tairua, New Zealand

[21] Appl. No.: 3,565

[22] Filed: Jan. 15, 1987

[51] Int. Cl.⁴ ............ A23P 1/08; A23P 1/10; A23L 1/04
[52] U.S. Cl. .................... 426/274; 426/92; 426/513; 426/518; 426/641; 426/646; 426/811
[58] Field of Search ........... 426/274, 92, 646, 513, 426/641, 518, 811

[56] References Cited

U.S. PATENT DOCUMENTS

| | | | |
|---|---|---|---|
| 2,255,796 | 9/1941 | Linane et al. | 426/513 |
| 2,527,493 | 10/1950 | Condon | 426/641 |
| 2,887,382 | 5/1959 | Rivoche | 426/518 |
| 3,141,779 | 7/1964 | Podebradsky et al. | 426/811 |
| 3,370,960 | 2/1968 | Jaccard | 426/274 |
| 3,681,094 | 8/1972 | Rogers et al. | 426/92 |
| 3,740,235 | 6/1973 | Weiner | 426/646 |
| 3,843,815 | 10/1974 | Reesman | 426/641 |
| 4,072,763 | 2/1978 | Mart | 426/92 |
| 4,210,677 | 7/1980 | Huffman | 426/518 |
| 4,574,087 | 3/1986 | Sheehy et al. | 426/513 |

Primary Examiner—Donald E. Czaja
Assistant Examiner—Helen Pratt
Attorney, Agent, or Firm—Mallinckrodt & Mallinckrodt

[57] ABSTRACT

A meat product which can be easily handled and portioned when cool, but separates into individual slices of meat when warmed is produced by mixing a temperature sensitive binder when such binder is in warm, substantially liquid form with a plurality of slices of meat. The meat-binder mixture is placed into forming means and is cooled to solidify the mixture and form a solid, formed meat product in which, when in cooled condition, the individual slices are bound together in a solid, substantially inseparable meat product. Upon subsequent heating of the solid product, the binder liquefies releasing individual slices of meat.

13 Claims, 1 Drawing Sheet

4,839,183

METHOD OF PRODUCING A SLICED MEAT PRODUCT

BACKGROUND OF THE INVENTION

1. Field

The invention is in the field of meat products.

2. State of the Art

Over the years there have been many types of meat products developed. In the area of fast food products particularly for use in sandwiches, either hot or cold, ground meat products are used extensively. Thus, ground meat products such as hamburger patties are used extensively in hot sandwiches, and ground meat products such as bologna or other so called luncheon meats and saugages of various types are used in cold sandwiches. Ground meat has a definite texture that identifies it as ground meat and it does not taste or feel like meat chunks, slices, or pieces. One reason for this is that ground meat is usually highly compressed in order to hold its shape. This gives the meat a high density. In many instances, such as with hamburger patties, it would be desirable to decrease the density of a patty so that the same weight portion of meat would produce a bigger patty and give the impression of more meat. In addition, it would be desireable to produce a meat product, such as a meat patty which gives the feel and texture of real meat rather than ground meat, but still maintains the tenderness of ground meat.

Sliced meat is popular for both hot and cold sandwiches. However, portioned sliced meat products are not generally available and in commerical operations, it is generally necessary to have a meat slicer and the special cuts of meat available to slice in order to make such sandwiches. Further, particularly if thin slices are used, slicing should be done close to the time the slices are actually used since sliced meat, particularly with thin slices, dries out rather rapidly. In addition, with sliced meat, slices must be selected and put into the sandwiches. It is difficult to get accurate weight portions of meat into a sandwich in this manner. Thus, sliced meat sandwiches are much more difficult to prepare and are more labor and material intensive than merely using a hamburger patty or a preportioned slice of luncheon meat.

SUMMARY OF THE INVENTION

According to the invention, a sliced meat product is either formed and portioned into individual portions or formed into a shaped solid product that can be easily cut into individual portions which will maintain their integrity as individual portions when cool, but will separate into individual pieces of meat slices when warmed to give a warmed meat portion having the texture, feel, and appearance of individual meat slices. The individual portions may be packaged and handled in similar fashion to hamburger patties so are easy to use and may be either raw for cooking at the place of use in fashion similar to hamburger patties or precooked so that mere warming of the product at the place of use, such as by a microwave oven or other warming oven, will cause the product to separate into its individual pieces. The precooked product can also be used cooled in similar manner to portions of luncheon meat.

The product in individual portioned form, when cool, comprise a coherent mass of meat slices of predetermined shape, size and weight. The product may have tenperature sensitive binders added, if necessary, to give the cohesiveness which holds the individual portion together. When the product contains raw meat slices, no additional binders are generally needed. With cooked meat slices, an additional binder such as gelatine may be used. Rather than individual portions, the product may provide a cohesive mass in the form of a loaf, roll, or be packed in a casing so that the user may easily cut off the desired individual portions.

A method for producing individual portions of a raw sliced meat product includes the steps of thinly slicing, rather than grinding, raw meat and then compressing and forming the slices into the preformed, portioned meat product. In a preferred embodiment of the invention, raw meat is sliced with the thickness of each slice being substantially uniform and being between about 1/32 and ⅛inch, and the slices are then fed to a conventional patty forming machine normally used for ground meat where it is formed into portioned patties in conventional manner by such machine, however, the pressure setting on such machine is preferably reduced from that used for ground meat so that the density of the patty is reduced from that of a similarly sized ground meat patty. It has been found that a density of between about fifty to eight pounds per cubic foot is sufficient.

A method for producing a sliced, cooked meat product of the invention includes the steps of mixing a temperature sensitive binder, such as a gelatine solution, when the binder is in liquid form with slices of meat, placing the meat-binder mixture into forming means such as a loaf mold or a chubb casing, and cooling the meat-binder mixture in the forming means to solidify the mixture to form a cohesive, solid, sliced meat product. This product may then be sliced into individually sized portions for use, such further slicing of the product being done when the product is made and then packaged as individual portions, or the product may be supplied in the larger form to be sliced by a user, either the end user, such as a fast food operation, or an intermediate user such as a sandwich producer who further distributes the sandwiches to others.

The sliced meat needs no special or uniform orientation when made into the product and it has been found that, with raw meat, because of the relatively large surface area of each slice of meat in contact with adjacent slices of meat, the product is stronger than a ground meat product and holds its shape better at a lesser density than a ground meat product. With cooked meat, the relatively large surface area of each slice provides good bonding areas between slices for the binder which results again in a product stronger than a ground meat product. It has been found that upon cooking or warming, the product has a tendency to expand, retain more of the natural meat juices, and to result in a product that tastes lighter and more like natural meat than does a ground meat product. Upon cooking, any binder used melts releasing the slices and the binder serves as a flavoring sauce.

THE DRAWINGS

In the accompanying drawings, which illustrate embodiments of the invention constituting the best mode presently contemplated for carrying out the invention in actual practice:

FIG. 1 is an elevation of a sliced meat patty of an embodiment of the invention;

FIG. 2, an elevation of a sliced meat patty of a second embodiment of the invention;

FIG. 3, a perspective view of an embodiment of the invention;

FIG. 4, an elevation similar to FIGS. 1 and 2, but showing the product after heating;

FIG. 5, a flow diagram schematically illustrating a process of the invention; and FIG. 6, a flow diagram schematically illustrating a second embodiment of a process of the invention.

DETAILED DESCRIPTION OF THE ILLUSTRATED EMBODIMENT

Figure 1:
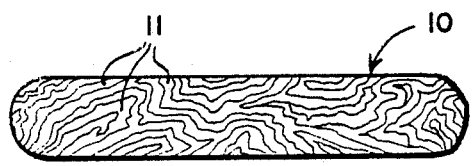

As shown in FIG. 1, one product of the invention comprises a portioned, sliced meat product in the form of a patty 10. The patty 10 comprises pieces of sliced, raw meat 11 which have been compressed into a patty shape of predetermined size which results in a patty of substantially predetermined weight. There are substantially no voids between the slices making up the patty. The slices adhere together to form a coherent mass which can withstand normal handling and storage prior to cooking without coming apart.

Figure 2:
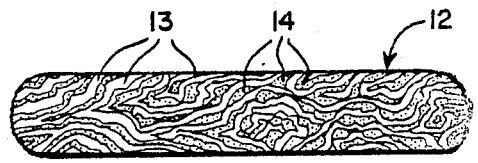

FIG. 2 shows a second product of the invention which again comprises a portioned, sliced meat product in the form of a patty 12. The patty 12 comprises pieces of sliced meat 13 with temperature sensitive binder material 14 between the slices to bind them together when below a predetermined temperature into a coherent mass which can withstand normal handling and storage prior to cooking without coming apart.

Figure 3:
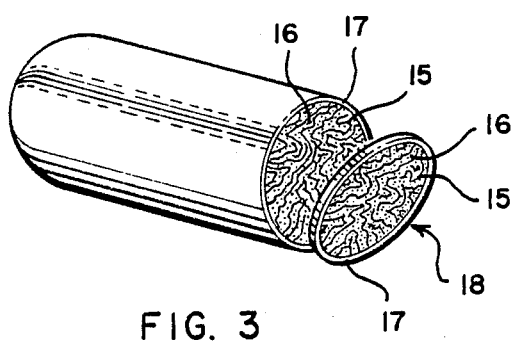

Either of the products as shown in FIGS. 1 or 2 may be formed as a bulk pack as shown in FIG. 3 from which individual portions may be sliced. Such bulk product is particularly useful for the cooked, sliced meat product of FIG. 2. Thus, the bulk pack as shown in FIG. 3 is made up of meat slices 15 with binder 16. The slices and binder may be forced into a casing 17 which forms the shape of the bulk pack. Individual slices 18 may be cut from the pack to be used as individual portions.

Figure 4:
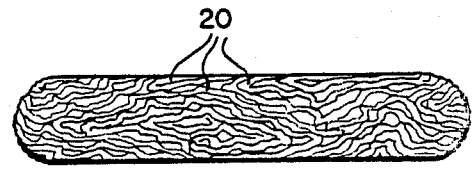

With the raw meat product as shown in FIG. 1, whether in an individual portion or in a bulk portion, it has been found that when cooked, the slices separate and the product expands to give substantially a pile of pieces of meat slices 20 as shown in FIG. 4.

Similarly, with the cooked meat product as shown in FIG. 2, whether in an individual portion or in a bulk portion, it has been found that when heated to a temperature at which the temperature sensitive binder melts, the slices separate and the product expands to give substantially a pile of pieces of meat slices 20 as shown in FIG. 4. In such case, the binder material will act as natural meat juices or as a gravy or sauce for the meat slices.

With either product, the product gives the appearance, feel, texture, and taste of sliced meat rather than ground meat, yet the product is as easy to use as are ground meat products. With thin slices of meat, even tough cuts of meat can be used and result in a tender sliced meat product. The slicing of the meat cuts through the meat without the tearing and mashing that results from grinding. Although sliced thin, the cells of the meat are not distributed to the extent they are in grinding, resulting in better meat flavor, appearance, and texture. The product is generally more moist than with a ground meat product because in cooking or warming, the natural meat juices are held between the slices rather than running out between the ground meat pieces.

Figure 5:
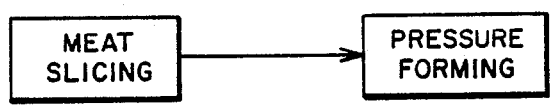

The product of FIG. 1 is made by slicing raw meat and then compressing the slices into a predetermined shape of predetermined size to form the raw sliced meat product. A schematic flow diagram of the process is shown in FIG. 5. The slices of meat should be relatively thin, meaning that for the particular finished product, multiple slices are used rather than merely one or two slices. It has been found that slices between 1/32 and ⅛ inch are satisfactory, however, where a quarter inch thick patty is the desired finished product, the larger slices such as ⅛ inch slices would generally not be used since the patty could then be formed with only two side-by-side slices. In such instance, slices less than 1/12 inch thick would be used and preferably slices in the range of 1/20 to 1/12 inch. The thickness of the slices used will depend not only on the type and size of finished product, but on the type of meat being used. The tougher the meat being used to make the product, the thinner the slices should be to result in a tender finished product.

The slices are compressed into the desired shape of predetermined size. This may be accomplished by placing the slices in a food pump of some type and pumping the mass of slices into a mold or casing. Compression to provide a meat density in the raw product of between about fifty and eighty pounds per cubic foot have been found satisfactory to provide good bonding between meat slices. For individually portioned product in the form of patties, a patty forming machine as generally used with ground meat may be used. It is preferred that the machine having the most gentle handling system be used and it has been found that a forming and portioning machine such as manufactured by Formax Corporation and known as the Vertiform Portioning/Patty Machine gives satisfactory results. This machine uses a constant pressure ram to fill the patty molds which is a more gentle handling system than most patty forming machines. This results in less attrition and disorientation of the slices. It also fills the molds more accurately with less pressure than most other patty forming machines.

While some folding, distorting, and random placing of the slices with respect to each other is desireable to avoid a shingled or neatly stacked patty, it is preferred to avoid a total mixing or balling of the slices in the patty as this will reduce the interlocking between slices and reduce the patty strength. A positive displacement pump for moving the slices into the patty molds reduces the mixing and disorientation of the slices.

While any type of slicing equipment may be used to slice the raw meat, high volume slicing is generally required in order to economically produce the finished product in commercial volumes. A satisfactory slicing apparatus to be used in producing the product is disclosed in my copending patent application Ser. No. 810,054, filed Dec. 17, 1985 and entitled "Slicing Apparatus and Process for Producing a Cooked, Sliced Meat Product". With the slicing equipment there described, the slices fall from the slicer into a conveyor. A positive displacement pump of the type identified as Model 62 Rotary Product Pump made by Egretier Co. has been found satisfactory for use as the conveyor because it substantially maintains the orientation of the slices through the conveyor as they come off of the slicer. The conveyor feeds the slices directly to the portioning and forming machine such as identified above.

The slices may be flavored prior to portioning by the addition of smoke or other flavoring material to the slices. In using the slicing equipment as disclosed in the above referenced application, such flavoring may be added to the slices as they come off the slicer in a closed environment and fall into the conveyor. The closed environment may contain actual smoke, or a smoke flavor or other flavorings may be misted into the chamber. The amount of flavoring used with the raw meat in this embodiment will be small enough so that it will not interfere with the binding qualities which bind the meat slices to each other.

After the forming of the product, the product may be packaged and then frozen, frozen and then packaged, or merely packaged and used as a fresh meat product rather than a frozen meat product. Further, the product could be cooked after forming to provide a cooked meat product, however, because the slices of meat separate upon cooking and the product looses its cohesiveness, the cooked product is not preferred if it is to be stored and transported prior to eating. The cooking preferably should take place immediately before eating.

An example of a product obtained using the Vertiform Portioning/Patty Machine as described above is a patty four inches in diameter by ½ inch thick. This patty weighs about 110 grams. A ground meat patty of the same weight would be only ⅜ inch thick. This represents a 25% reduction in density of the meat in the patty and a 33% increase in patty thickness in the raw state. Upon cooking of the patty, the test being performed using a continuous oven such as a N.P.O. Oven made by Heat and Control Corp., a cooking weight loss of 22% to 25% occured for the product of the invention as compared to a 30% to 32% loss using a ground beef patty. The patty of the invention maintained at least the same bulk density advantage over the ground meat as in the raw state and the patty of the invention increased in thickness by about 20% while the shrinkage across the diameter of the patty was about the same as for the ground meat patty.

The raw meat product of the invention may be packed, shipped and handled similarly to hamburger patties, but upon cooking, produces a pile of sliced meat with a much lighter and moister texture than a hamburger patty, and gives the appearance of a larger portion of meat. This is true even where the density of the raw product may be similar to that of a ground meat product because the slices of the product separate causing the overall patty to expand upon cooking whereas the ground meat patty maintains its density throughout cooking and remains a cohesive mass during and after cooking.

Figure 6:

A process for producing the meat product as shown in FIG. 2 is shown in FIG. 6 and includes the steps of mixing meat slices and a temperature sensitive binder material while the binder material is in substantially liquid form, placing the meat-binder mixture in a forming means such as a mold or casing, and cooling the meat-binder mixture in the forming means to solidify the mixture to form a solid, cohesive sliced meat product.

The process of FIG. 6 will generally be used in making a cooked, sliced meat product because in cooking the meat, the natural proteins in the meat are reacted, thereby destroying their bonding ability. Thus, merely pressing slices of cooked meat together as in the process of FIG. 5, will not result in a cohesive mass of meat slices that will stay together during normal handling of the product. Thus, with cooked slices, a binder needs to be added to produce a cohesive mass.

The binder used is a temperature sensitive binder meaning that below a certain temperature, the binder is substantially solid and holds the meat slices together in a coherent mass and that above the certain temperature, the binder no longer acts as a binder, and allows the individual pieces of meat to separate and come apart as individual slices. Gelatine has been found to be a satisfactory binder and is particularly compatible with meat slices in that during the cooking of the meat slices gelatine is released from the slices so there is a certain amount of natural gelatine present. However, the amount of gelatine naturally present is not enough to bind the cooked slices together into a coherent mass that will withstand normal handling or that can be cut or portioned. Various gelatines may be used as the added binder and it has been found that the commercially available unflavored gelatine is satisfactory. The amount of gelatine needed depends upon the type of gelatine used. Enough gelatine is necessary to form a cohesive mass when cooled that, if made in bulk as shown in FIG. 3, may be easily portioned and such that the individual portions, however formed, are cohesive enough when cool to stick together through normal product handling.

The temperature at which the gelatine or other binder melts may be adjusted to some extent by the type and amount of gelatine or other binder used. The temperature may be chosen to keep the product a coherent mass at normal room temperature so that the product does not have to be maintained in cooled condition relative to normal room temperature to be handled and must be heated above room temperature to separate into the individual slices. Alternatively, if desired, the temperature may be chosen so that as long as the product is maintained at a cooled temperature relative to normal room temperature, it is a coherent mass, but when allowed to warm to room temperature, the individual slices separate.

The gelatine or other binder will be mixed as a solution and while in substantially liquid form is mixed with the meat slices. Best results are achieved when substanially all surfaces of the individual meat slices are coated with the binder solution. The mixture of meat and binder solution is then placed in a forming means and cooled so that it solidifies into a coherent mass. While the meat and binder solution can merely be placed in a mold of some type and allowed to harden, it is generally preferred that it be under some pressure during forming so that all voids between meat slices are filled with binder and so that a preset ratio of meat to binder solution is achieved. Where a straight sliced meat product is desired (no apparent sauce on the meat) it has been found that about 10% binder solution to 90% meat is a good ratio. In such cases, the binder may be a gelatine water solution, but it is preferred that the gelatine solution also include any natural meat juices that run from the meat as it is being cooked. Water would merely be used as necessary to supplement the available natural meat juices. The meat slices and gelatine solution are pumped into the forming means such as a chubb casing shown as 17 in FIG. 3 and cooled in such casing. The resulting bulk product may then be easily sliced into individual portions or patties 18. These portion may be used alone as meat entrees or may be put into sandwiches. In either case, when waremd in a warming oven or microwave oven to a temperature above that at which the gelatine melts, the gelatine melts releasing the meat slices which expand and form a portion of loose meat slices. The liquid gelatine solution will remain substantially on the surfaces of the meat slices as natural meat juices to give the product a desireable moisture content and natural flavor. Of course, if desired, various flavorings could be added.

Where a meat with sauce product is desired, the binder takes the form of the desired sauce, such as barbeque sauce, cream sauce, or gravy. In this instance, the gelatine is mixed with the desired sauce to form the gelatine solution which is mixed with the meat slices. Again, the meat-binder mixture is formed such as by pumping into a chubb casing. With a sauce product, the ratio of binder (sauce) to meat will be greater than with the pure meat product. It has been found that a ratio of 35% sauce to 65% meat is satisfactory with many sauces. For sandwich use, it is desireable that the sauce coat the meat slices but remain on the slices and not run off into the bread or roll. The 35% sauce has been found good for sandwich use. However, the ratio of sauce to meat can vary substantially as desired, and the percentage which will remain coating the meat without running off will depend to a large extent on the consistency of the sauce and also on the thickness of the slices. The thinner the slices, the more surface area of meat for a given weight of meat. The more surface area, the more sauce that will stick to the meat.

Where a meat with sauce product is made, the meat slices may either be cooked or raw since the sauce will interfere with the natural binding properties of the raw meat slices so the binder is necessary to produce a coherent product. When raw meat slices are used, the resulting product must be cooked rather than merely warmed.

In the making of a cooked meat product as shown in FIG. 6, the slices may be introduced into the mixer as fully cooked slices, as partially cooked slices, or as raw slices. If not introduced as fully cooked slices, the slices may be cooked while mixed with the binder solution. Thus, the mixer may be heated so that the meat-binder mixture therein reaches a temperature wherein the meat becomes fully cooked, or the binder may be introduced into the mixer at a temperature that, when mixed with the meat results in the meat-binder mixture reaching a temperature at which the meat is considered fully cooked.

While any type of meat slicing and mixing equipment may be used, again, equipment that has been found satisfactory for use is the slicing equipment disclosed in my copending patent application Ser. No. 810,054, filed Dec. 17, 1985 and entitled "Slicing Apparatus and Process for Producing a Cooked, Sliced Meat Product". With that equipment, cooked, partially cooked, or raw meat is sliced and falls from the slicer into a hopper and conveyer. A sauce is sprayed on the slices as they fall from the slicer into the hopper, the sauce in the making of the product of this invention being the binder solution, either the natural meat juice-gelatine solution or the sauce-gelatine solution. If the meat being sliced is not fully cooked, the solution sprayed onto the meat will generally be at a temperature above that at which the slices of meat are considered fully cooked. The meat slices, if partially cooked, may be such that the temperature on the edges of the slices are above that at which the meat is considered fully cooked, but the center of the slices are below that temperature. The temperature of the meat-binder mixture in the hopper is above the temperature at which the meat is considered fully cooked and as the mixture remains in the hopper and is conveyed to the portioning and packing equipment, it equilibrates and the temperature of all of the meat reaches the temperature at which it is considered fully cooked. The time the meat-binder mixture remains in the hopper and conveyor may be adjusted to ensure full cooking of the meat. Thus, the product that is portioned and packaged is fully cooked. Also, with such equipment, all processing at least between slicing and packaging can take place in a closed, sterile environment so that a sterile product which resists spoilage is produced. The atmosphere in the closed environment may be controlled to reduce oxygen content if desired, by using nitrogen or carbon dioxide. The portioning and packaging equipment may be equipment for packing bulk casings of the product or may be patty forming equipment as described for the raw meat product of FIG. 1. Various other portioning and packaging equipment could also be used.

Rather than forming the product into a mold or casing, the product could be moved through a cooled forming housing having a forming passage therein through which the product is forced and cooled so that it becomes a cohesive mass as it moves through the passage. The cohesive mass is then extruded from the passage and slicced into portions as it leaves the passage.

The cooked meat product of the invention may be used in its cold, cohesive state as sandwich meat, but its big advantage is that it can be used in its cold, cohesive state to make sandwiches, and when the sandwich is to be eaten, the sandwich is merely warmed in a warming or microwave oven to give a hot, sliced meat sandwich. This is paticularly advantageous for the many fast food outlets, such as convenience stores, which have warming facilities but do not have cooking facilities.

Of course, the invention is useful and advantageous in many other situations also.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of producing a meat product, comprising the steps of mixing a temperature sensitive binder when such binder is in warm, substantially liquid form with a plurality of slices of meat; placing the meat-binder mixture into forming means; and cooling the meat-binder mixture in the forming means to solidify the mixture and form a solid, formed meat product whereby when in cooled condition, the individual slices are bound together in a solid, substantially inseparable meat product and upon subsequent heating of the solid meat product, the binder liquifies producing individual slices of meat.

2. A method of producing a meat product according to claim 1, wherein the temperature of the meat-binder mixture prior to cooling reaches a temperature of at least the temperature at which the meat slices are considered fully cooked.

3. A method of producing a meat product according to claim 2, wherein the slices in the product are fully cooked meat slices and wherein the meat-binder mixture prior to cooling is allowed to remain at the temperature at which the meat slices are considered fully cooked for a period of time sufficient to ensure that all meat slices in the mixture reach the temperature at which they are considered fully cooked.

4. A method of producing a meat product according to claim 3, wherein the meat slices prior to mixing with the binder are not fully cooked and become fully cooked while in the mixture.

5. A method of producing a meat product according to claim 4, wherein the meat slices prior to mixing with the binder are partially cooked.

6. A method of producing a meat product according to claim 1, wherein the binder is a gelatine solution.

7. A method of producing a meat product according to claim 1, wherein the forming means is a casing.

8. A method of producing a meat product according to claim 7, wherein the meat-binder mixture is forced under pressure into the casing.

9. A method of producing a meat product according to claim 8, wherein the casing is a chubb.

10. A method of producing a meat product according to claim 7, wherein the product is portioned into individual portions by slicing the solid sliced meat product into slices of predetermined portion size.

11. A method of producing a meat product according to claim 1, wherein the product is portioned into individual portions by slicing the solid sliced meat product into slices of predetermined portion size.

12. A method of producing a meat product according to claim 1, wherein the forming means form individual portions of the product.

13. A method of producing a meat product according to claim 12, wherein the forming means is a patty forming machine.

* * * * *